(12) United States Patent
Bose

(10) Patent No.: US 7,591,866 B2
(45) Date of Patent: Sep. 22, 2009

(54) METHANE GAS RECOVERY AND USAGE SYSTEM FOR COALMINES, MUNICIPAL LAND FILLS AND OIL REFINERY DISTILLATION TOWER VENT STACKS

(76) Inventor: Ranendra Bose, 14346 Jacob La., Centreville, VA (US) 20120-3305

( * ) Notice: Subject to any disclaimer, the term of this patent is extended or adjusted under 35 U.S.C. 154(b) by 502 days.

(21) Appl. No.: 11/394,576

(22) Filed: Mar. 31, 2006

(65) Prior Publication Data

US 2007/0231233 A1 Oct. 4, 2007

(51) Int. Cl.
*B01D 50/00* (2006.01)
(52) U.S. Cl. .................. 55/337; 55/317; 55/385.3; 55/408; 55/409; 55/400; 55/404; 55/405; 55/406; 55/407; 95/39; 95/269; 95/270
(58) Field of Classification Search .............. 55/317, 55/385.3, 404–409, 400; 95/269, 270
See application file for complete search history.

(56) References Cited

U.S. PATENT DOCUMENTS

| | | | |
|---|---|---|---|
| 2,789,032 A | 4/1957 | Bagley et al. | |
| 3,861,142 A | 1/1975 | Bose | |
| 3,892,070 A | 7/1975 | Bose | |
| 3,918,937 A | 11/1975 | Holloway et al. | |
| 4,235,845 A | 11/1980 | Bose | |
| 4,399,107 A | 8/1983 | Bose | |
| 6,398,851 B1 | 6/2002 | Bose | |
| 2002/0033098 A1* | 3/2002 | Hiltunen | 95/269 |

FOREIGN PATENT DOCUMENTS

| | | |
|---|---|---|
| CA | 1030777 | 5/1978 |
| CA | 1104060 | 6/1981 |

OTHER PUBLICATIONS

US. Doe Test Report, "Reliability & Lifecycle Testing of the Automobile, Anti-Air Pollution & Energy Conservation System", Mar. 1980, Jointly Published~Gulf ResearchLab, Pittsburgh & Inventor: Mr. R.K. Bose, P.E.
US. E.PA Report No: EPA 430-K-04-003 dated Jul. 2004, entitled "Identifying Opportunities for Methane Recovery at US. Coal Mines: Profiles of Selected Gassy Underground Coal Mines: 1997-2001".
"CANMET", Canadian Mineral & Energy Technologies has developed. TradeMark technology based on catalytic flow-reversal reactor developed for VAM oxidation with less than 1% Methane Conc. in VAM.
MEG-TEC # System (Defere, Wisconsin) has developed a a Trade Mark technology. "Vocsidizer"~a thermal flow reversal reactor for oxitaizing 1% Conc. of Methane in VAM gas exhausts.

* cited by examiner

*Primary Examiner*—Robert J Hill, Jr.
*Assistant Examiner*—Dung Bui

(57) ABSTRACT

Ventilation Air Methane (VAM) exhaust gases from coal premine gob wells, landfills and oil refinery (Installations) vent stacks are used, after adequate compression, for energizing a high-speed gas turbine. The convoluting gas discharge cause a first separation stage by stratifying of heavier non-combustible and lighter combustible gas components that exit from the turbine in opposite directions; the heavier components having a second stratifying separation in a vortex tube to separate non-combustible, heaviest pollutants from non-combustible medium heavy components. The non-combustible, medium components exit a vortex tube open end to atmosphere. The lighter combustible Methane gas effected in the first separation is piped to the Installation's engine for combustion, thereby reducing its Methane pollution and improving its fuel economy. The heaviest pollutants from the second separation stage are piped to air filters, which separates the water and particulates from the heaviest gases, which are released to the atmosphere.

2 Claims, 5 Drawing Sheets

METHANE GAS RECOVERY AND USAGE SYSTEM FOR COALMINES, MUNICIPAL LAND FILLS AND OIL REFINERY DISTILLATION TOWER VENT STACKS

CROSS-REFERENCES TO RELATED APPLICATIONS

This Invention is an improvement over the system shown in my prior U.S. Pat. No. 6,398,851B1 issued Jun. 4, 2002; U.S. Pat. No. 4,399,107 issued Aug. 16, 1983; U.S. Pat. No. 4,235,845 issued Nov. 25, 1980; U.S. Pat. No. 3,892,070 issued Jul. 1, 1975; U.S. Pat. No. 3,861,142 issued Jan. 21, 1975 and Canadian Patent Nos: 1,104,060 issued Jun. 30, 1981; 1,030,777 issued May 5, 1978. All USA and Canadian patents are incorporated by reference herein, the present disclosures being based primarily on these.

FEDERALLY SPONSORED RELIABILITY AND LIFECYCLE TESTS.

My patented, "Anti-Pollution System For Automobiles", Experimental Prototype, herein after referred to as the Bose System, was based on U.S. Pat. Nos. 4,235,845; 3,892,070 and 3,861,142. This System received an US D.O.E Grant Award from its Office of Energy Related Inventions. The Grant was used to demonstrate the Bose System's pollutant gas separation and emission control efficiencies along with the fuel economy achieved, as compared with the OEM Catalytic Converter, as a retrofit application on a new 1979 Model Chrysler Cordoba V8, 5.9 Liter engine capacity test automobile. After completion of the baseline, dynamometer powered tests with the OEM converter at 1,134 and 12,140 service miles, the three-way converter was removed and replaced with the Bose System prototype, leaving all other OEM pollution accessories in place, including the controlled electronic ignition combustion and the exhaust gas recirculation systems. Eight dynamometer test results, using the 1975 CVSII Federal Test Procedure (FTP), were used to verify the repeatability and lifecycle of the Bose System over 50,000 service-test miles. All tests were performed at the Gulf Research Laboratory, Pittsburgh, Pa. The comparative test results submitted in US DOE Report, "Reliability & Lifecycle Testing of the Automobile, Anti-Air Pollution & Energy Conservation System", March 1980, are referenced in U.S. Pat. No. 6,398,851 & are summarized as follows:

(A) A lifecycle pollutant emissions study based on these test data has estimated that the lifecycle pollutant emissions for the catalytic converter was 2,621,488 grams as compared to the Bose System's emissions of 900,000 grams.(B) The Bose System's fuel economy based on the converter's fuel consumption was 6.7% in city driving and 19% in High way driving conditions. (C) Special Test #4 dedicated to the measurement of Bose System Centrifugal Pollutant Gas Separation efficiency was 75.5% for Hydrocarbons (HC), 71.8% for Carbon Monoxide (CO), 68.8% for Nitrogen Oxide(NOx). See Table below:

BOSE SYSTEM'S POLLUTANT GAS SEPARATION EFFICIENCY:
(PROPRIETARY TEST DATA: GULF RESEARCH LABORATORY)

1. TAILPIPE EXHAUST GAS EMISSION ANALYSIS:

| Dynamometer Test Description (see Test #4, Final Report) | Sample Bag # | Tailpipe Gas Analysis (as recorded: using 45% air dilution) | | | Tailpipe Gas Analysis (undiluted estimate of gas concentration) | | |
|---|---|---|---|---|---|---|---|
| | | HC (ppm) | CO (%) | $NO_x$ (ppm) | HC (ppm) | CO (%) | $NO_x$ (ppm) |
| Cold Transient Run | 1 | 284.3 | 0.252 | 44.0 | 412.24 | 0.365 | 63.8 |
| Stabilized Run | 2 | 94.93 | 0.018 | 46.87 | 166.13 | 0.0315 | 82.0 |
| Hot Transient Run | 3 | 126.89 | 0.045 | 71.73 | 184.0 | 0.065 | 104.0 |
| 1(a) Average Tailpipe Emissions (3 Bags) | | 168.7 | 0.105 | 54.2 | 254.14 | 0.154 | 83.26 |

| Separated gas concentrations recorded in Table III: at sample points | Type of Gases Separated | Pollutant Gases Separated (undiluted) | | |
|---|---|---|---|---|
| | | HC (ppm) | CO (%) | $NO_x$ (ppm) |

2. EMISSION ANALYSIS OF POLLUTANT GAS SEPARATED IN BOSE SYSTEM:

| | | | | |
|---|---|---|---|---|
| Tee-Joint 'B' | Lighter—HC & CO, NO | 697.85 | 0.343 | 284.0 |
| Tee-Joint 'C' | Heavier—HC, $NO_x$ | 876.0 | 0.445 | 81.99 |
| 2(a) Average concentration of separated gases | | 787.0 | 0.394 | 183.0 |

-continued

BOSE SYSTEM'S POLLUTANT GAS SEPARATION EFFICIENCY:
(PROPRIETARY TEST DATA: GULF RESEARCH LABORATORY)

3. TOTAL ESTIMATED AUTO EXHAUST EMISSIONS RECORDED IN TEST #4
(subtotal of lines 1(a) and 2(a) above tabulation):

Total estimated exhaust emissions

| | | | |
|---|---|---|---|
| 3(a) Subtotal of lines 1(a) and 2(a) | 1041.14 | 0.548 | 266.0 |

4. BOSE SYSTEM'S POLLUTANT GAS SEPERATION EFFICENCY (%):

Gas separation efficiency

| | | | |
|---|---|---|---|
| Line 2(a) ÷ Line 3(a) | 75.5 | 71.8 | 68.8 |

TABLE III

SEPARATED EXHAUST GAS CONCENTRATIONS
Hydrocarbons, Carbon Monoxide, Nitric Oxides, and
Aldehydes Determined at Three Sampling Locations
During Test No. 4 (Sample Points as Designated By
Mr. R. K. Bose in the Control System)

| | Designated Sample Point | | |
|---|---|---|---|
| | Point A | Point B | Point C |
| Sample Volume, Cubic Ft. | 0.66 | 0.55 | 0.60 |
| Moles Carbonyl | 0.00175 | 0.00329 | 0.00470 |
| Carbonyls, Mg/Cubic Ft. | 80 | 180 | 224 |
| Carbon Monoxide, % | 0.148 | 0.343 | 0.445 |
| Carbon Dioxide, % | 2.05 | 10.17 | 11.66 |
| Hydrocarbons, PPM | 257.26 | 697.85 | 876.02 |
| $NO_x$, PPM | 80.23 | 284.03 | 81.99 |

Note:
For Sampling Locations: A, B and C, See FIG. 1 (excerpt from USPat#6,398,851)

BACKGROUND OF INVENTION

The present Invention relates generally to a significant method for the purified recovery of CM Methane ($CH_4$) gas by its centrifugal separation from its very diluted concentration of 0.1~0.4% in underground Ventilation Air Methane (VAM), which is created by blowing an average 300,000 cubic feet/minute (CFM) air through the huge coal mining tunnels. This Ventilation System generates nearly 64% of coal mine methane emissions released, from most of the world's gassy coal mines. However, significant reduction in the ventilation air results in pockets of CMM of concentration of 5~15%, which create serious mine explosions and loss of life. Additionally, these diluted VAM gases are not easily combustible, and require significant pre-heating in catalytic beds, which are prohibitive in cost. Thus, the VAM gases are generally released to atmosphere, causing serious long term Global Warming phenomenon.

Hence, the use of the Bose System modified to incorporate a Gas Compressor between the Bose System and the VAM pipeline, see FIG. 1(A): for the Pre-mining Coalmine's Gob-Well; FIG. 1(B): for Land Fill; FIG. 1(C) for Oil Refinery; provides a consistent CMM gas pressure, required for the high speed operation of the Bose gas turbine. This results in the recovery of 30~95% purity of Methane gases. These gases could be injected into the natural gas pipelines, or burnt in natural gas-engine driven, Generators, to produce electrical energy for the coal mine's, landfills, refinery use or distributed to the Community electrical grid, at a significant Return on Investment (ROI).

FIELD OF THE INVENTION

Methane Emissions As a Global Warming & Heat Trapping Gas

The role of Carbon Dioxide ($CO_2$) in the atmosphere as a heat trapping medium which causes 74% of the global warming phenomenon is well-known. However, not so well known is the significant contribution of 16% global warming by Methane ($CH_4$) gas released to the atmosphere, by a variety of natural and human-related sources. The latter sources include landfills, natural gas and petroleum systems, agricultural activities, coal mining, stationary and mobile combustion, wastewater treatment and certain industrial process. In the US, coal mines account for about 10% of all man-made methane emissions. These emissions are more potent than $CO_2$ as methane exists in the atmosphere for 9~15 years. As a greenhouse gas, it is 21 times more effective in heat trapping than carbon dioxide over a 100~year period. Also, methane is a primary constituent of natural gas and is an important source of energy, having a heat (calorific) value of 1000 BTU/cf. Thus, efforts to prevent or utilize methane emissions can provide significant energy, economic and environmental benefits.

Methane gas and coal are formed simultaneously during coalification, a process in which biomass is converted by biological and geological processes into coal. Methane is stored within coal seams and the rock strata surrounding the seams. Methane is released when pressure within a coal bed is reduced as a result of natural erosion, faulting or mining. In underground mines, methane poses a serious safety hazard for miners because it is explosive in low concentrations (5~15% in air). In the U.S, methane concentration in the mine working areas can not exceed 1% and other locations 2% respectively. This Coal Mine Methane (CMM) can be solely controlled through the use of very large, high energy Ventilation Air System (VAS), which pumps from 100,000~3,000,000 cfm air through the coal mine tunnels, giving methane concentrations of 0.1~0.79%. This data and other Mining facts mentioned in this Application are extracted from Reference #1: US EPA Report No: EPA 430-K-04-003 dated July 2004, entitled "Identifying Opportunities for Methane Recovery at U.S. Coal Mines: Profiles of Selected Gassy Underground Coal Mines: 1997~2001."

Methane Drainage Techniques:

Drainage Methods include (a) Vertical Pre-mine wells, (b) Vertical Gob wells, (c) Long hole, horizontal bore holes, (d) Horizontal and Cross-measure Bore holes: FIG. 1(B). Vertical Pre-Mining Wells: are the optimal method for recovering high quality gas from the coal seam before the mining operations begin. These are similar in design to oil and gas wells. These are drilled into the coal seam several years in advance of mining. Vertical wells require hydraulic or nitrogen fracturing of the coal seam to activate the flow of methane, usually of around 90% purity when new, degrading to 20% or less in a few years. These wells generate from 50% to over 70% methane that would otherwise be emitted during mining operations, if they are drilled 10 years in advance. These gases are blended with pure Natural gas, in order to conform to at least 95% methane concentration and no more than 2% of incombustible gases (such as, carbon dioxide, nitrogen and hydrogen sulfide) for pipeline sales.

DESCRIPTION OF THE RELATED ART~37 CFR 1.97 AND 1.98

Ventilation Air Methane Use Technologies:

Ventilation air methane (VAM) is now recognized as an unused source of energy and a potent atmospheric greenhouse gas (GHG). A host of recently introduced technologies can reduce ventilation air methane emissions, while harnessing methane's energy, and can offer significant benefits to the world community. Reference 1~identified two technologies for destroying or beneficially using the methane contained in ventilation air: the VOCSIDIZER, a thermal flow-reversal reactor developed by MEGTEC Systems (De Pere, Wis., United States), and a catalytic flow-reversal reactor developed expressly for mine ventilation air by Canadian Mineral and Energy Technologies (CANMET—Varennes, Quebec, Canada). Both Trademark technologies employ similar principles to oxidize methane in mine ventilation airflows. Based on laboratory & field experience, both units can sustain operation (i.e., can maintain oxidation) with ventilation air having uniform methane concentrations down to approximately 0.1 percent. For practical field applications where methane concentrations are likely to vary over time, however, this analysis assumes that a practical average lower concentration limit at which oxidizers will function reliably is 1.5 percent. In addition, a variety of other technologies such as boilers, engines, and turbines may use ventilation airflows as combustion air. At least two other technology families may also prove to be viable candidates for beneficially using VAM. These are VOC concentrators and new lean fuel gas turbines.

Thermal Flow Reversal Reactor

The Sketch below shows a schematic of the Thermal Flow Reversal Reactor (TFRR). The equipment consists of a bed of silica gravel or ceramic heat-exchange medium with a set of electric heating elements in the center. The TFRR process employs the principle of regenerative heat exchange between a gas and a solid bed of heat-exchange medium. To start the operation, electric heating elements preheat the middle of the bed to the temperature required to initiate methane oxidation (above 1,000° C. [1,832° F.]) or hotter. Ventilation air at ambient temperature enters and flows through the reactor in one direction and its temperature increases until oxidation of the methane takes place near the center of the bed. The hot products of oxidation continue through the bed, losing heat to the far side of the bed in the process. When the far side of the bed is sufficiently hot, the reactor automatically reverses the direction of ventilation airflow. The ventilation air now enters the far (hot) side of the bed, where it encounters auto-oxidation temperatures near the center of the bed and then oxidizes. The hot gases again transfer heat to the near (cold) side of the bed and exit the reactor. Then, the process again reverses. TFRR units are effectively employed worldwide to oxidize industrial VOC streams.

Catalytic Flow Reversal Reactor

Catalytic flow reversal reactors adapt the thermal flow reversal technology described above by including a catalyst to reduce the auto-oxidation temperature of methane to as low as 350° C. [662° F.]). CANMET has demonstrated this system in pilot plants & is now in the process of licensing Neill & Gunter, Dartmouth, Nova Scotia, to commercialize the design (under the name VAMOX). CANMET is also studying recovery options for profitable turbine electricity generation injecting a small amount of methane (Gob gas or other source) increases the methane concentration in ventilation air can make the turbine function more efficiently. Waste heat from the oxidizer is also used to preheat the compressed air before it enters the expansion side of the gas turbine.

Energy Conversion from a Flow-Reversal Reactor

There are several methods of converting the heat of oxidation from a flow-reversal reactor to electric power, which is the most marketable form of energy in most locations. The two methods being studied by MEGTEC and CANMET are:

Use water as a working fluid. Pressurize the water and force it through an air-to-water heat exchanger in a section of the reactor that will provide a non-destructive temperature environment (below 800° C. [1472° F.]). Flash the hot pressurized water to steam and use the steam to drive a steam turbine-generator. If a market for steam or hot water is available, send exhausted steam to that market. If none is available, condense the steam and return the water to the pump to repeat the process.

Use air as a working fluid. Pressurize ventilation air or ambient air and send it through an air-to-air heat exchanger that is embedded in a section of the reactor that stays below 800° C. (1472° F.). Direct the compressed hot air through a gas turbine-generator. If gob gas is available, use it to raise the temperature of the working fluid to more nearly match the design temperature of the turbine inlet. Use the turbine exhaust for cogeneration, if thermal markets are available.

Since affordable heat exchanger temperature limits are below those used in modern prime movers, efficiencies for both of the energy conversion strategies listed above will be fairly modest. The use of a gas turbine, the second method listed, is the energy conversion technology preferred for economic reasons. At a VAM concentration of 0.5 percent, one vendor expects an overall plant efficiency in the neighborhood of 17 percent after accounting for power allocated to drive the fans that force ventilation air through the reactor.

Other Technologies

USEPA has also identified other technologies that may prove able to play a role in and enhance opportunities for VAM oxidation projects. These are briefly described below.

Concentrators

Volatile organic compound (VOC) concentrators offer another possible economical option for application to VAM. During the past 10 years the use of such units to raise the concentration of VOCs in industrial-process air exhaust streams that are sent to VOC oxidizers has increased. Smaller oxidizer units are now used to treat these exhaust streams, which in turn has reduced capital and operating costs for the oxidizer systems. Ventilation air typically contains about 0.5 percent methane concentration by volume. Conceivably, a concentrator might be capable of increasing the methane concentration in ventilation air flows to about 20 percent. The highly reduced gas volume with a higher concentration of methane might serve beneficially as a fuel in a gas turbine, reciprocating engine, etc. Concentrators also may prove effective in raising the methane concentration of very dilute (0.4%) VAM flows to 1.6%, that will support oxidation in a TFRR or CFRR. (Italics added for emphasis, as my new invention better fulfills this Concentrator need)

BRIEF SUMMARY OF INVENTION

Among the several objects and advantages of the present invention may be noted:

the prevention of atmospheric pollution by methane ($CH_4$), ethane ($C_2H_6$), carbon dioxide($CO_2$) and coal particles here to fore emitted in significant proportions from the exhaust gases of Pre-mine bore holes and In-mine Gob Wells, and Ventilation Air Stacks of underground Coal mines;

the provision of a new and improved apparatus for separating the different gaseous and particle components constituting the exhaust gas emission from underground coal mines for the purpose of appreciably reducing the proportion of harmful and, or pollutant gases/particles being present in such gases which are emitted into the atmosphere;

the provision of an improved apparatus for separating gases/particles in a gas/particle mixture having different molecular weights/densities, which is compact, continuously operative, inherently reliable and may be simply and inexpensively manufactured and retrofitted to all in-use coal mines' Gob Wells and Vent Air stacks;

the provision of a novel and improved apparatus which may be universally applied for separating the combustible gases/particles from the noncombustible gases/particles in the exhaust gas being emitted from any type of Municipal Landfill, Oil Refinery Fractionating Tower' Vent gas burner, engine or turbine and which increases the thermal efficiency of the same by permitting the return of the combustible gases/particles to the burner for subsequent re-combustion.

In accordance with the teachings of the present invention, it has been found that the foregoing objects and their attendant advantages can be realized with a conventional Pre-mine/In-mine Gob Well and Vent Air stacks, as is used in existing coal mines, and hereinafter referred to as "Methane Outlets (MO)", by providing an anti-exhaust gas pollution and thermal regenerative device having no moving parts and which, when connected to the "Methane Outlets (MO)", operates automatically to substantially separate the heavier incombustible, components from the lighter combustible component of the outlet gas, & recycles the lighter, combustible components, causing the same to be directed back into the air-intake of the engine/turbine for further or complete combustion.

Since the "Methane Outlet" gases are substantially being released at atmospheric pressure, the teachings of the present invention requires the retrofit of an electrically driven, variable flow, adjustable discharge pressure Gas Compressor(s) of either centrifugal or rotary screw type with each device or a plurality of devices, as may be required to fully energize these devices;

This device simply comprises an elongate converging, vortex tube which terminates in a small discharge outlet at one end and fitted with a down-stream stator wheel, at its large junction end with the cylindrical housing of the turbine impeller and immediately adjacent to the impeller. A suitable support for the impeller is provided on a hollow axial rotary shaf, extending up to the large end of the vortex tube and exteriorly of the cylindrical housing carried on high temperature/high speed ball bearings, or magnetic or air bearings, within the cylindrical housing, the outer end of which is fashioned into an annular chamber for the circulation of the bearing's cooling water from the System's gas engine-radiator. An upstream stator wheel is mounted to the inside of the cylindrical housing of the turbine impeller and immediately ahead of it. An inlet pipe is arranged and disposed near the closed, wall end of the cylindrical turbine housing for discharging the "Methane Outlet" gases from the coal mine tangentially, or peripherally therein.

As the pressurized "Methane Outlet" gas is introduced through the inlet pipe, it is directed through the upstream stator wheel for reducing the gas turbulence before its impact on the turbine impeller blades. The expansion of the gas through the turbine blades causes the turbine to speedup considerably, which increases the speed of the exhaust gas mass passing there through into the downstream stator wheel and into the conical vortex tube, wherein the convoluting gas mass is centrifugally stratified into three layers, in accordance with their molecular weights: the inner core comprises of the lighter combustible Methane gases (molecular wt=16) which are fed back through the hollow shaft of the gas turbine to the air/fuel intake of the gas engine/turbine, prior to their recombustion in the engine/turbine; the middle layer comprises impurities: nitrogen ($N_2$~mol. wt=28), ethane ($C_2H_6$~mol. wt=30) gases and air (mol.wt=28.5) which exit to the atmosphere through the small end of vortex tube; the outermost layer comprises the heavier non-combustible carbon dioxide ($CO_2$~mol.wt=44)) gases and carbon particles ($C_2$) which are separated through elongated, radial slots milled at the smaller end of the vortex tube and collected in the second separation stage chamber. The particles being solid, falls by gravity to the chamber bottom and are removed. The $CO_2$ is released to the atmosphere.

The present invention incorporates the technology for reducing the "drop-out" amount of the carbon or other particles (PM) in the second separation stage chamber by (a) milling the radial slots of the vortex tube end at a tilt angle 30 degrees to vertical, with the tilt conforming towards the gas exit pipe of said second separation stage chamber, (b) by applying an industrial friction reducing, high temperature, abrasion-resistant coating to the said chamber's inside surface. Additionally, the present invention incorporates the use of a plurality of compressed air in-line filter assemblies as an improved apparatus than the chemical chambers of my prior Art, but shown in FIG. 1 of my prior U.S. Pat. No. 6,398,851 B1 dated Jun. 4, 2002, for the removal of water vapor and carbon particles from the separated Methane and Carbon dioxide gas streams separated from the Outlet gas stream of the Pre-mining or In-mining Gob Well or Ventilation Air Stacks of existing underground Coal Mines. This Carbon and water vapor removal is effected by their centrifugal dispersal and selective removal by the passage of these separated gases through the top stator vanes/porous elements of the said plurality of air filter assemblies.

BRIEF DESCRIPTION OF THE DRAWINGS

The present invention is shown in the accompanying drawings wherein.

DETAILED DESCRIPTION OF THE INVENTION

Figure 1:
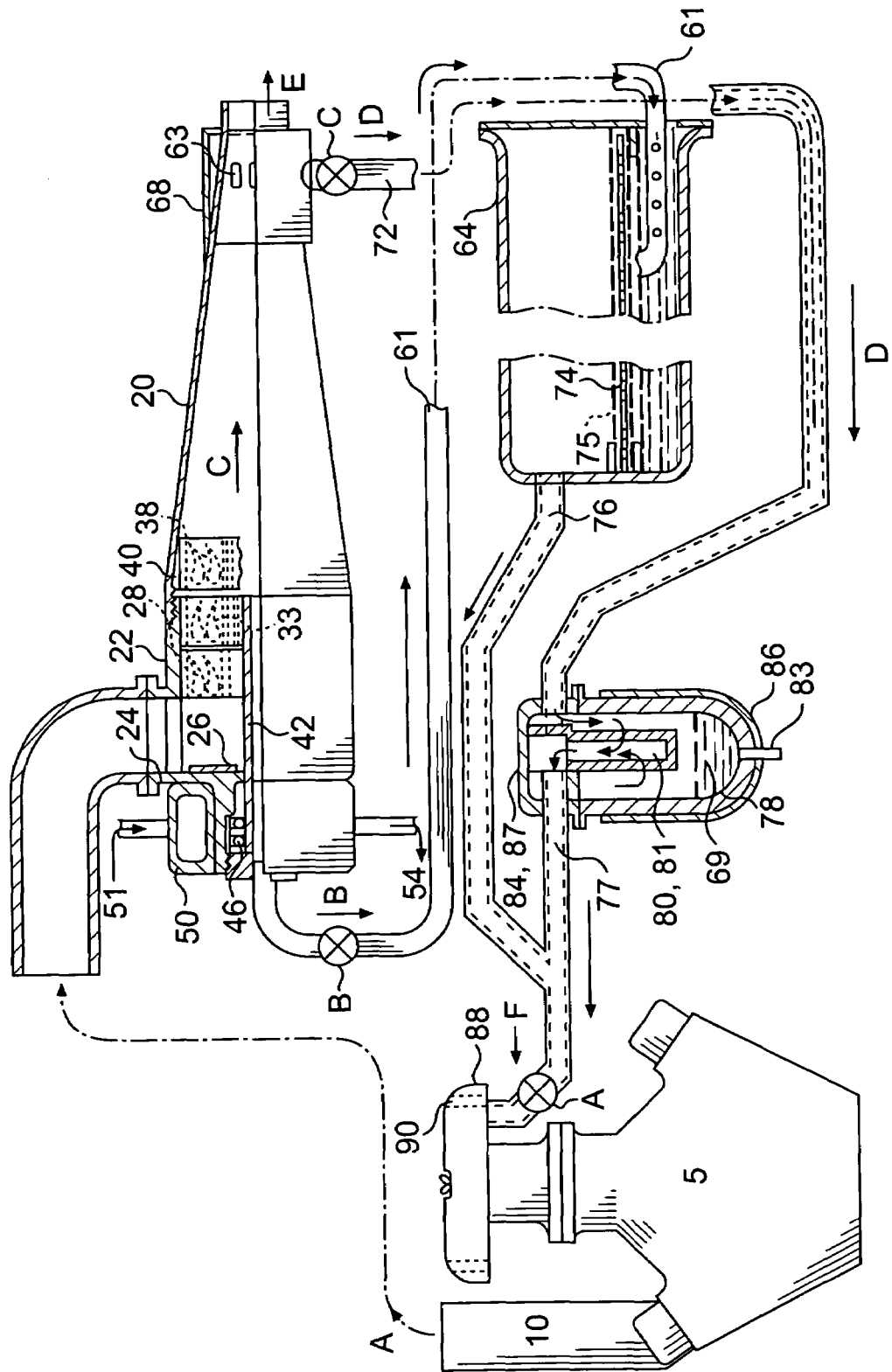
FIGS. 1(A), 1(B), 1(C): are diagram illustrations of the overall System, its main components as installed on a Gob Well Stack of Coal Mines; LandFill; Refinery Stacks.
Figure 1A:
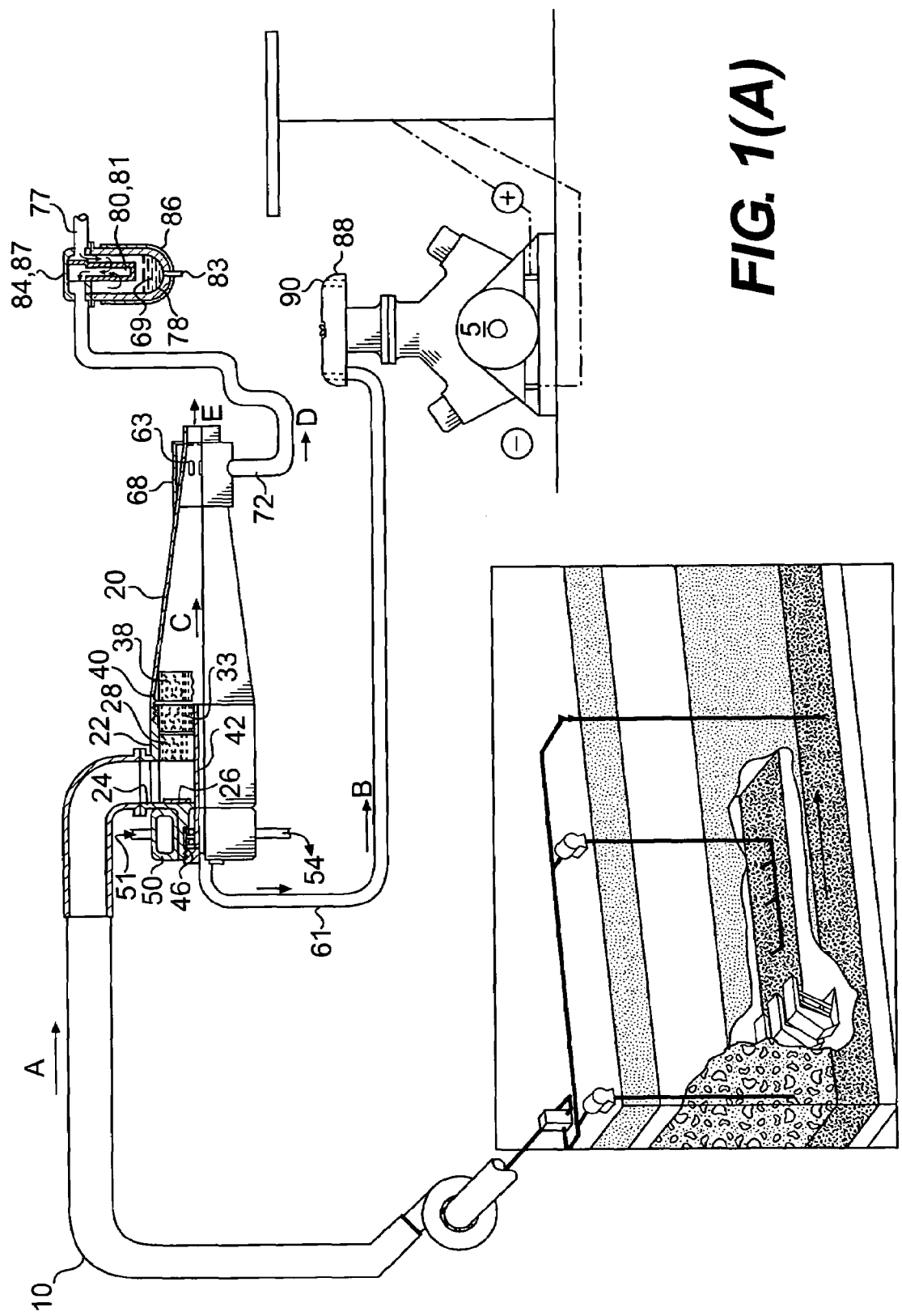
Figure 1B:
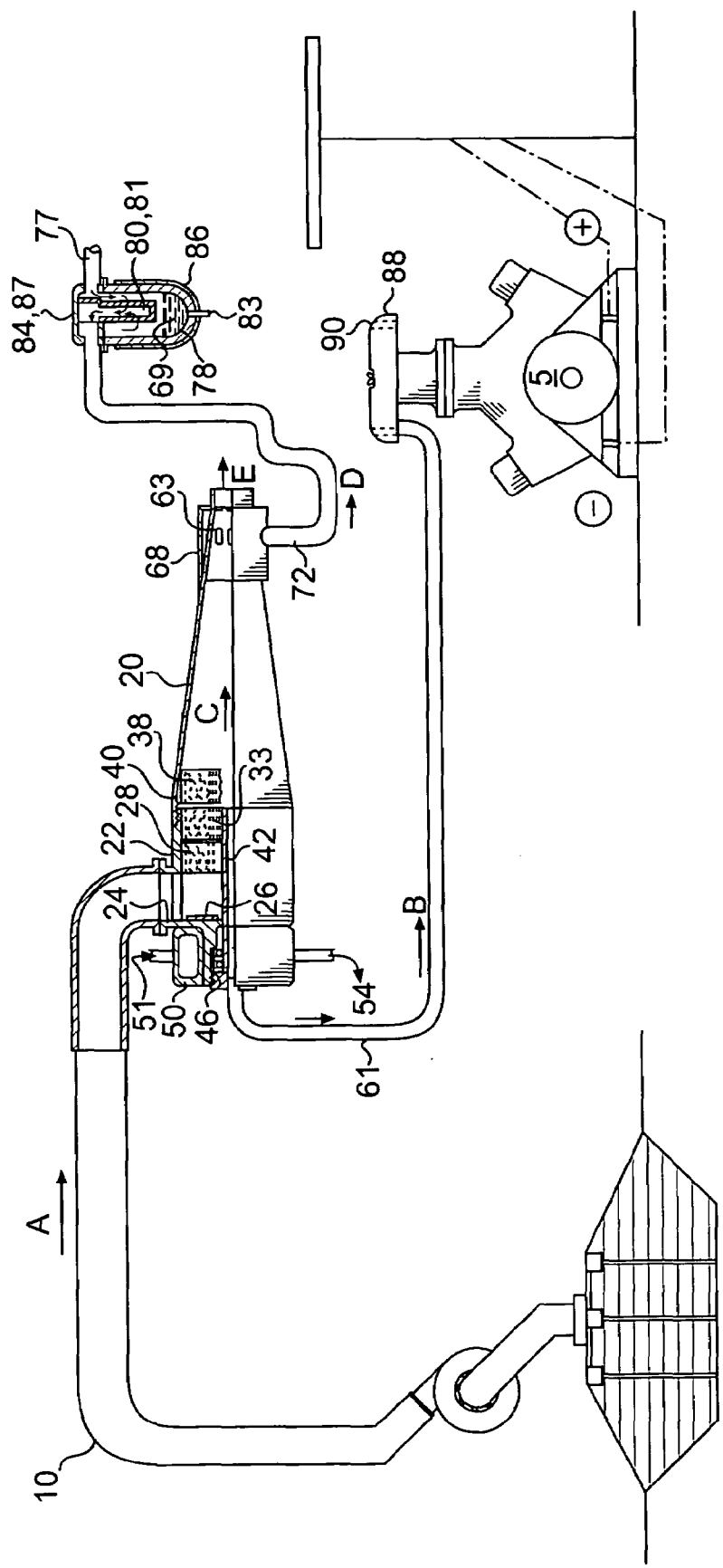
Figure 1C:
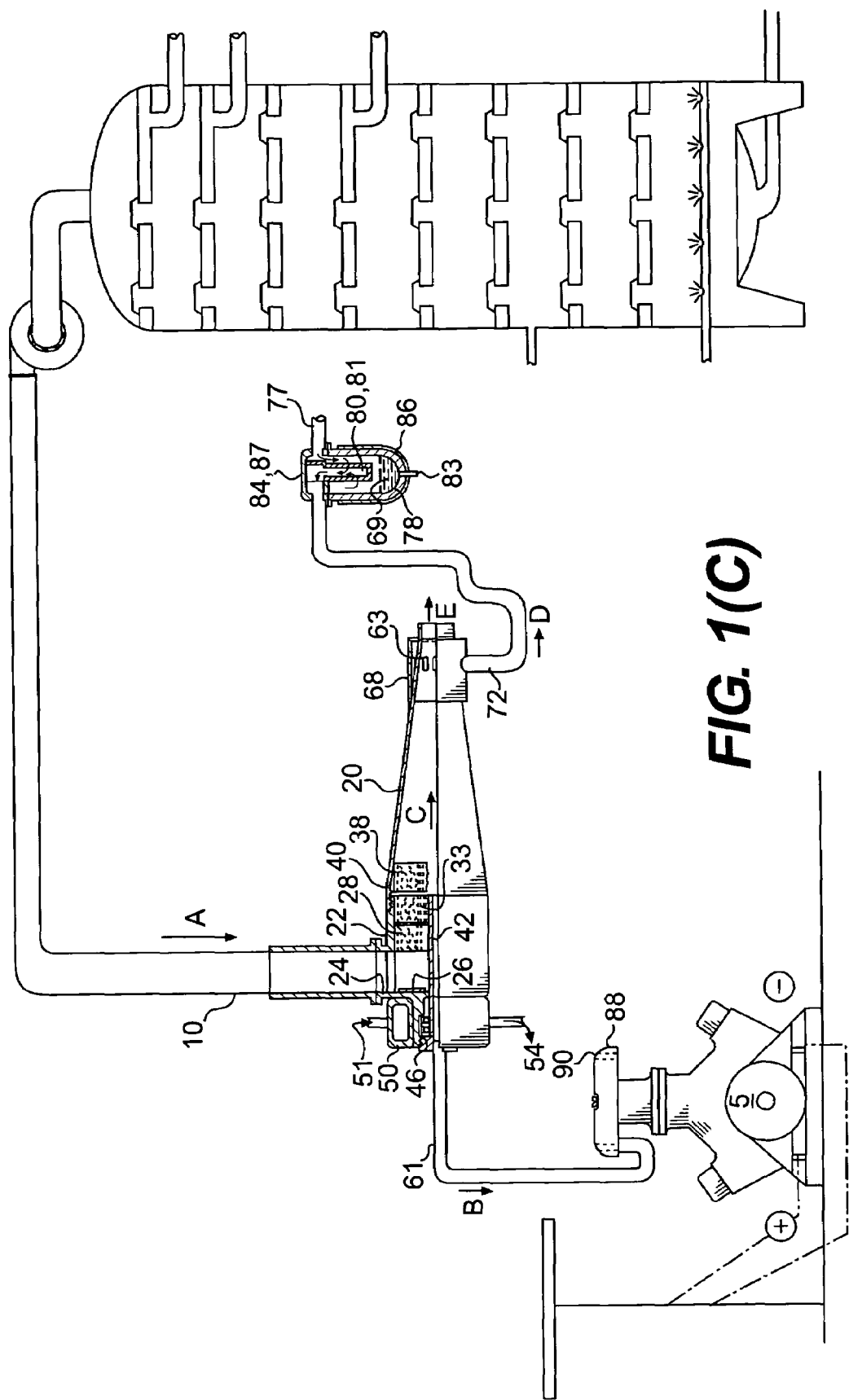

The Methane recovery and usage system for the present invention may be used on existing underground coal mines' gob well or land fill or refinery stacks, (herein after referred to generally as mine stacks), as illustrated in FIGS. 1(A), 1(B), 1(C). The alphabetical reference characters A-E designate the gases or gas mixtures as follows:

Arrow Gases
A: Exhaust from the mine,landfill or refinery stacks' gas mixture of combustible, non-combustible gases, and carbon or silicoethane or sulfur particles feed to rotate the turbine.
B: Lighter inner core of gas mixture comprising primarily combustible gas: methane, are fed into the air intake of the natural gas engine or gas turbine.
C: Heavier of the heavy outer layer of gas mixture of combustible and non-combustible gases, such as, carbon dioxide and carbon or silicoethane or sulfur particles and the lighter of the heavier gases: nitrogen, dilution air, water vapor with traces of ethane.
D: Substantially, a mixture of the heavier of the heavy gases, as above. These gases are passed through a plurality of compressed air filter, for the collection of coal or other particles listed, prior to the release of the carbon dioxide gases to the atmosphere.
E: Substantially, a mixture of the lighter of the heavier gases, such as nitrogen, dilution Air, water vapor, carbon monoxide, traces of ethane are released to the atmosphere.

In FIG. 1(A) of the drawing, the exhaust Methane Outlet (MO) of Gob Well 5 connects via CF Gas Compressor 10(a) and its discharge pipe 10 to the inlet at the larger end of the vortex tube 20, this being a cylindrical housing 22 to which the vortex tube connects, and having entry port 24 connecting to pipe 10. Within such housing is a heat shield 26 and stator wheel 28 secured upstream of turbine impeller wheel 33, downstream of which is a further stator wheel 38 located at the larger end of the vortex tube and secured by welding as at 40.

A suitable support for the impeller is provided on a hollow steel axial rotary shaft 42 extending up to the large end of the vortex tube and exteriorly of the cylindrical housing carried on a pair of high temperature/high speed, steel ball bearings, (alternatively an air bearing or magnetic bearing may be used, if higher turbine rotary speed is required and a higher cost is permissible) 46, within the cylindrical housing of the outer end of which is fashioned into a hub from which radially extends the engine radiator-water cooled Housing 50, water pipes 51, 54.

The cylindrical housing may, as shown, be a single integral aluminum casting along with the exhaust gas inlet port 24. The stator wheel 38 can be fixed inside the front end of vortex tube in any obvious manner, as by welding, shrink or force fitting, splining.

It will be apparent from the above description that exhaust gases from pipe 10 in the direction of Arrow A, enter stator wheel 28 where they are deflected to smoothly pass through to the impeller 33 effecting rotation of the impeller carried on the bearings 46 via shaft 42. In this instance, the gases enter into the impeller and emerge from the stator 38 spinning in a direction to centrifugally stratify in the vortex tube 20. Thus, the core of the lighter gas mixture passes reversely through the hollow shaft 42, in the direction Arrow B, through pipe 61 and introduced to bottom of the air filter housing 88, 90. This effects the First Separation Stage components as installed on a coal mine Ventilation Air or Gob Well Stack, or Municipal Landfill or Oil Refinery Stack.

However, the mixture of heavier gases moves in the direction of Arrow C and, still rotating upon reaching the outer smaller end of the vortex tube 20, the heaviest incombustible gases, comprising the heavier carbon dioxide gases and particulates(PM) exhaust emerge through the ports 63 into the Second Separation Stage chamber 68 and then via pipe 72 in the direction of Arrow D to the "Compressed Air Filter Assembly" 87. The lighter of the heavier gases (nitrogen, traces of ethane and dilution air) are exhausted to the atmosphere at the end of the vortex tube, see Arrow E.

The present invention has overcome the carbon/coal, or silicoethane or sulfur particulate (PM) emission problem by substituting a plurality of specially selected, in-line air filter assemblies normally used for separating the water vapor and particles from compressed air supply. See FIG. 1, Items 84 & 87. This Assembly comprises of an aluminum body consisting of inlet port and outlet port of ½" NPT screwed orifice to attach to pipe 72 and 77 conveying the separated heavier carbon dioxide gases and carbon particles in gas stream D. As this stream flows at a high speed, into the polycarbonate bowl 78 of the air filter assemblies, it convolutes through its top stator vanes prior to flow through the 25~40 micron size holes in the polypropylene filter elements (Items 80&81) of the filter assemblies. Such convolutions drop the heavy carbon/ other particles over 40 microns as it coalesces with the water vapor droplets, 69 into the bottom of the bowl, but allowing the carbon dioxide gas, to flow through the filter element pores and release to the atmosphere. Whereas, the carbon particles (PM) are collected in the bowl and periodically discharged to the mine surface by means of an automatic, preset valve 83.

The said air filter assemblies are designed to operate with compressed air supply at up to 125 F. temperature, 150 psig pressure and 75 scfm or larger flow rate. The said operating parameters are within the requirements of the present invention. This method of Differential Separation of carbon particles e and water vapor from carbon dioxide gas by the use of air filter assembly 'elements' of varying porosity is a novel process, which will be one of the claims of this improved invention. However, the construction of this filter assembly will be of no patentable moment herein.

Referring back to the stator 28, the placement of such a stator before a turbine impeller is of conventional practice. However, the placement of the stator 38 down stream of the impeller 33, while of apparent conventional practice, is by no means for conventional effect found in gas turbines. Experimentation and testing brought to light the puzzling effect that the lighter gases through the pipe 61 were being slowed up for some reason or other at an engine speed of about 1300 rpm. in at least two different test automobiles. It was ultimately discovered that the rotating gas mass leaving the turbine impeller blades was spinning in a direction opposite to the rotational direction of the impeller. It was further found that such opposite directional rotation was slowing down the lighter combustible gas mixture passing through pipe 61. Accordingly, in order to prevent such opposite rotation of a gas mixture leaving the turbine impeller, the stator 38 was added in order to redirect such gas mixture in to the same rotational direction as the impeller. The result produced was that the passage of gas mixture in the core of the whirling mass in the vortex tube faced lesser flow resistance in passing through the sleeve 42.

Thus, the slow-down of gas flow in pipe 61 was alleviated. A further beneficial effect was found in the addition of the stator 38, in that it improved the separation quantity of the lighter gas mixture passing from the vortex tube through the hollow shaft 42 and likewise increased the quantity of heavier gas mixture passing toward the second separation stage 68. This is attributed to the increased conversion of exhaust gas pressure energy into higher velocity energy effected by the presence of the stator 38. Thus, an overall improved separation effect was noted.

While still on the subject of the turbine, and whereas in my prior patent it was stated that the impeller should have a number of blades equal to the number of cylinders in the engine or a multiple thereof, it has now been ascertained that, by using a multiple of two, the impeller speed for a particular exhaust velocity is considerably increased. Thus, an actual experimentation with an eight-cylinder engine, it has been found that providing sixteen blades on the impeller considerably enhanced the rotational speed of the gases passing there through. Also, by virtue of the stator 38 which prevented the opposite rotation of such gases with regard to the turbine impeller, the greater rotational speed produced a stronger centrifugal separating effect between the heavier and lighter gas components.

Based upon this knowledge, the present invention will develop matching gas turbine cross-sections with 16 to 24 blade' design, to suit the respective coal mine Gob Well/Ventilation Air stack, or Land Fill or Oil refinery Stack's, air flow rates.

Finally, the Methane gas recovered from the Mine Stacks and purified in the Bose System as described above, is conveyed through pipe 61 for its re-cycling into either the turbine air intake or gas-engine's air intake manifold 90. The Methane gas is sucked in by virtue of the engine/turbocharger air intake vacuum and burnt with significant reduction of atmospheric pollution and energy cost savings. An alternate method of gas input to the engine air intake could be through a vacuum control valve operated by engine manifold vacuum and set to open for recycled gas flow to the engine at between 13" and 16" of vacuum. Various other arrangements can also be made.

Although U.S. Pat. Nos. 4,399,107 and 4,235,845 had used air-fins (Item.50, FIG. 1) for cooling the high-temperature ball bearings of the turbine's hollow shaft, it was found that air cooling was insufficient to prevent the relative expansion of the steel hollow shaft within its ball bearing sleeves, thereby changing its operating clearances. This change in assembly clearance caused the turbine to slow down at peak exhaust gas flow, reducing the system's gas separation efficiency. Also, it caused the ball bearing to "seize up" after 25,000 miles of service runs. In order to guarantee a 50,000 miles service life for this invention, an improved engine radiator water cooled housing has also been included in the present invention (See FIG. 1, Item 50). Additionally, the impeller & stator wheels are of the shrouded type as used in prototype experiment & testing: ref U.S. Pat. No. 6,398,851.

Figure 2B:
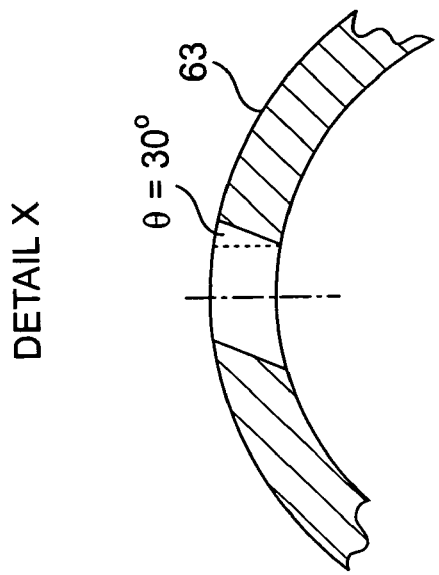
FIG. 2(B): is the cross-sectional detail of the vortex tube small end, radial slots
Figure 2A:
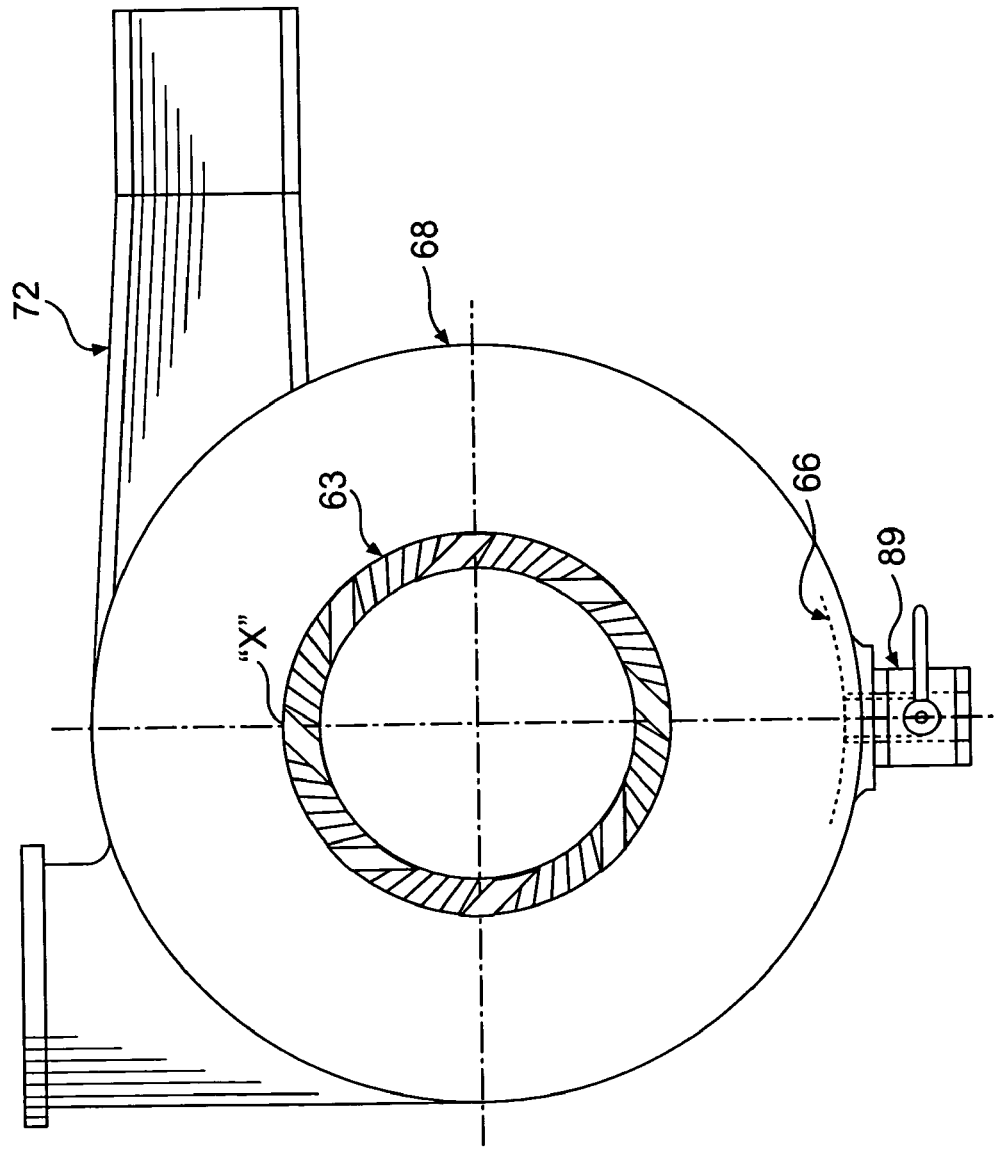
FIG. 2(A): is the cross-sectional end view of the Second Separation Chamber of the System's conical vortex tube located at its smaller end.

Past experimentation with the prior art of this invention on an automobile using leaded gasoline confirmed significant centrifugal separation of lead particles from the main exhaust gas stream into the separated heavier pollutant gas stream. Also, significant amounts of lead particles dropped out inside the second separation stage chamber (FIG. 2A, Item 68), due to the radial nature of discharge of the separated solid particles caused because of radial slots provided in my prior art described in U.S. Pat. No. 3,861,142. The radially discharged particles impinged perpendicularly on the inside surfaces of the said separation chamber and bounced back radially, rather than follow an orderly convoluting gas flow around the chamber.

It was discovered that the application of an Industrial low-friction, high-temperature, abrasion resistant, thermosetting and organic coatings,(Item 66) made on the inside surfaces of said chamber (Item 68) can significantly reduce the lead, carbon and other solid particles' dropout and increase their transport down stream via delivery pipe (Item 72). Refer to: Modern Manufacturing Process Engineering, by B. W. Niebel, McGraw Hill, 1989, Tables 15.2 and 15.3. for specifications and properties of possible Industrial coatings.

This enhanced separation efficiency due to the discovery of said Industrial coatings would be applicable to carbon/coal or silicothane or sulfur particulate treatment in the Coal mines, or Municipal Landfills or Petroleum Oil Refinery Stack Applications, respectively. This feature of the present invention is based on the advantage accruing from the principle of "stream-lined flow of gases" and allows the carbon/coal, or silico-ethane or sulfur particles with the separated heavier gases from the second separation stage to collect efficiently in the delivery pipe (Item72) for their transmittal to the air-filter assemblies. This feature of my present invention is one of the important claims.

Additionally, it was discovered that changing the location of the delivery pipe (Item 72) to a tangential position on the periphery of the second separation chamber (Item 68) and conforming with the rotational direction of the convoluting exhaust gas mass, further raised the separation efficiency of the heavier pollutant gas stream. See FIG. 1 and FIG. 2A, Item 72. Further more, it was discovered that machining the sides of the eight, ⅜"×⅝" slots at the smaller end of the vortex tube to a 30 degree 'tilt' angle to the vertical axis, with the 'tilt' conforming towards the outlet pipe 72, will improve the separation efficiency of the heavier pollutant gas stream and the carbon/coal, or silicothane or sulfur particles. See FIG. 2B. This feature of the present invention is based on the advantage accruing from the principle of "stream-lined flow of gases." Thus, the 'tilt' angle machined to the slot's side exit edges allowed the separated, heavier gases along with the carbon or lead and sulfur particles to emerge in a free flow out of the slots and collect smoothly in the delivery pipe72 for their transmittal to the air filter assemblies. Hence, this feature of my present invention is one of the notable claims submitted.

In spite of these improvements, some of the larger particles: coal in Mines or silico-ethanes in Landfill applications, will continue to drop out into the bottom of the second separation chamber, Item 68. A manually operated, two-way, ⅜"NPT brass ball valve is installed at the bottom, in order to periodically remove such sediments in automobiles of average usage. However, an electrical solenoid-activated, 12-Volt, two-way ⅜" ball valve is available for application on high-usage automobiles, and/or diesel buses, trucks of larger engine size, in order to automatically remove such sediments at every engine switch-off. See FIG. 2A, Item 89. These utility developments of the second separation stage chamber are important features and claims of this invention.

What is claimed is:

1. A method of separating components of the Ventilation Air Methane (VAM) exhaust gas from underground Coal Mines, or Landfills or Oil Refinery Fractional Distillation Towers for subsequent re-cycling of pollutant and combustible components, thereby reducing air pollution generated by such installations, and increasing the fuel economy of internal combustion engines/turbines of these installations, said method comprising:

compressing the exhaust gas;
allowing turbine expansion of the compressed gas;
  wherein compressing and allowing expansion effects a first separation of the exhaust gas into heavier and lighter components wherein the lighter components are primarily combustible pollutants;
effecting a second separation in which the heavier components are separated into a first portion comprising substantially of nitrogen, dilution air, and negligibly of combustible pollutants for egress to the atmosphere; and a second portion comprised substantially of non-combustible carbon dioxide gas and particulate matter (PM) particles: carbon/coal (in coal mines), or silico-ethane (in landfills), or sulfur (in oil refinery) for controlled egress to the atmosphere;

providing means for periodical and automatic removal of the carbon/coal, or silico-ethane, or sulfur particles respectively;
and providing means for transporting the lighter combustible components effected in the first separation for recycle to said engines.

2. The method of claim 1, wherein compressing and allowing expansion of the exhaust gas produces a high speed, convoluting and stratifying gas mass based on molecular weights of the gas components.

* * * * *